May 17, 1938.  R. W. GRISWOLD, 2D  2,117,607
SLOTTED DEFLECTOR FLAP
Filed Aug. 4, 1936  2 Sheets-Sheet 1
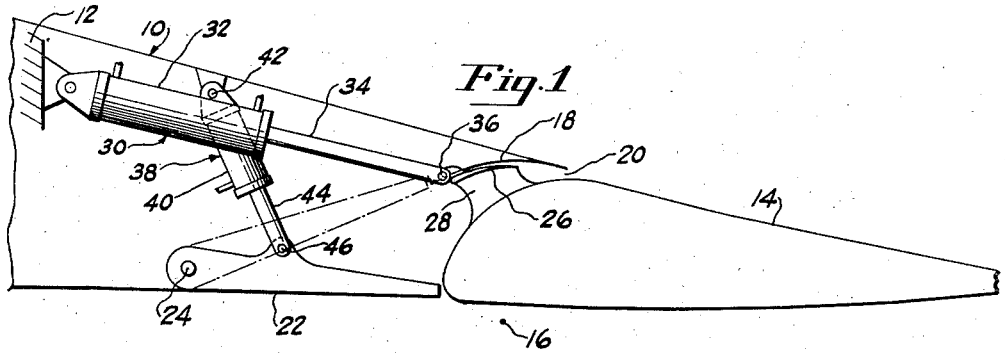
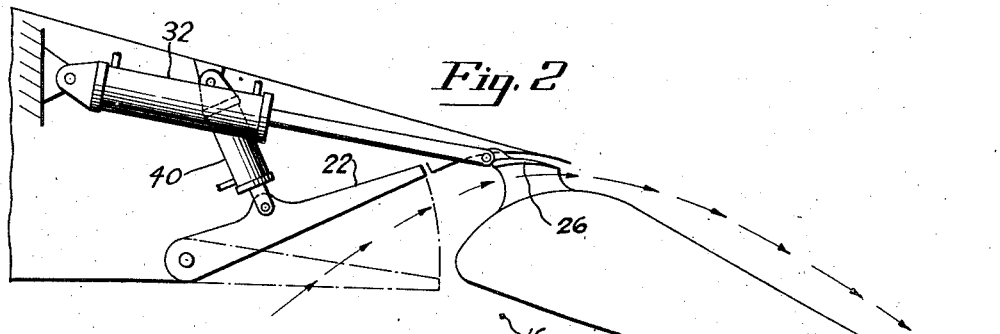
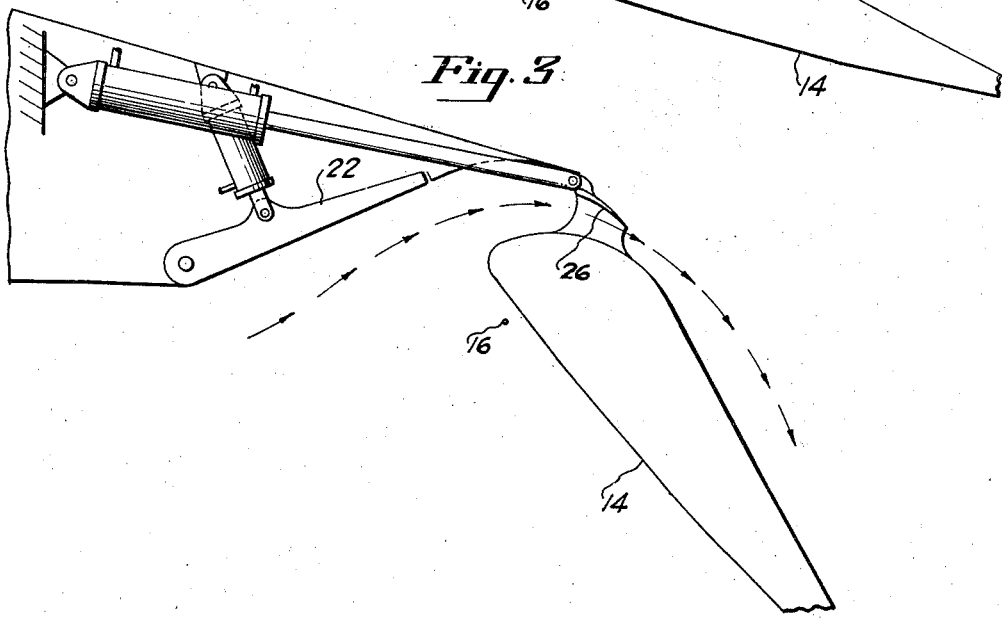
INVENTOR.
Roger W. Griswold
BY
Harris G. Luther
ATTORNEY

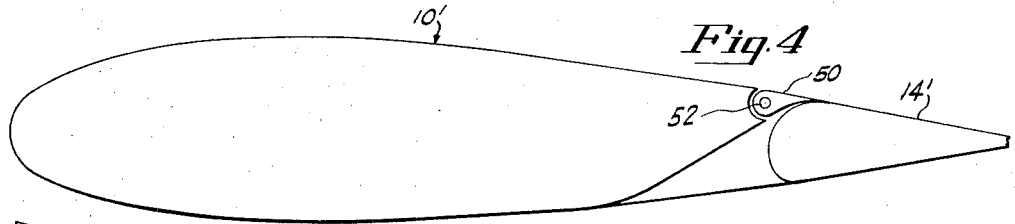
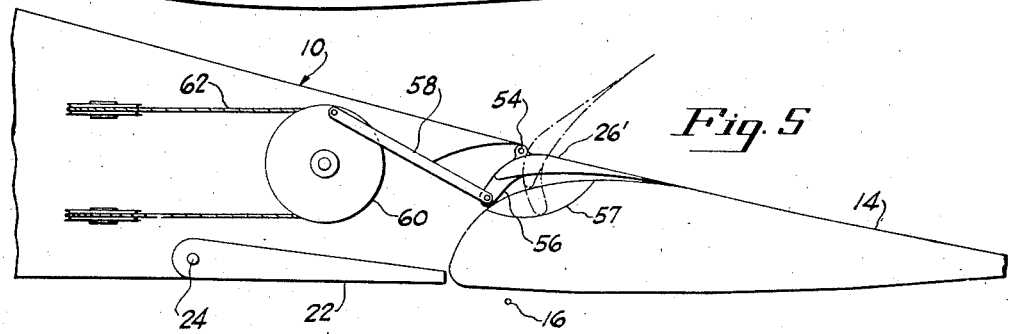
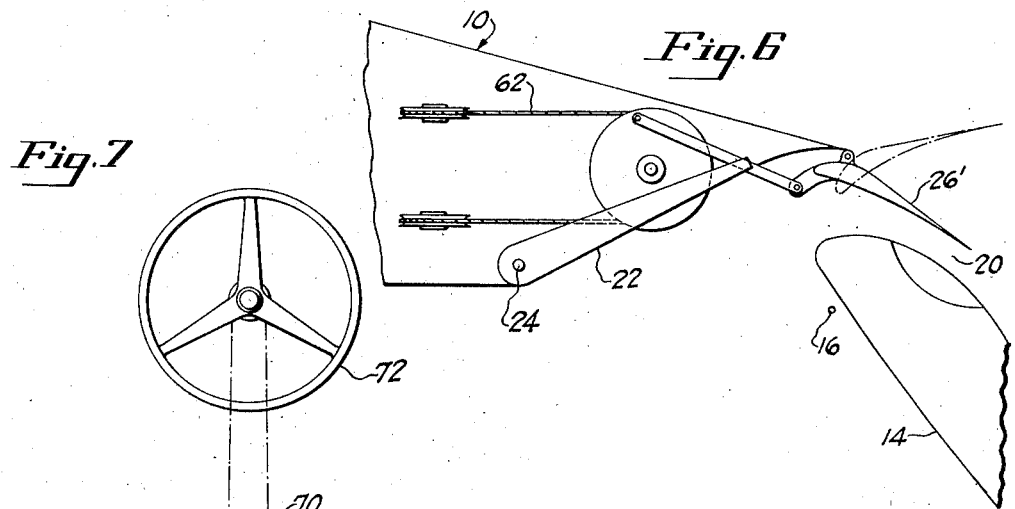
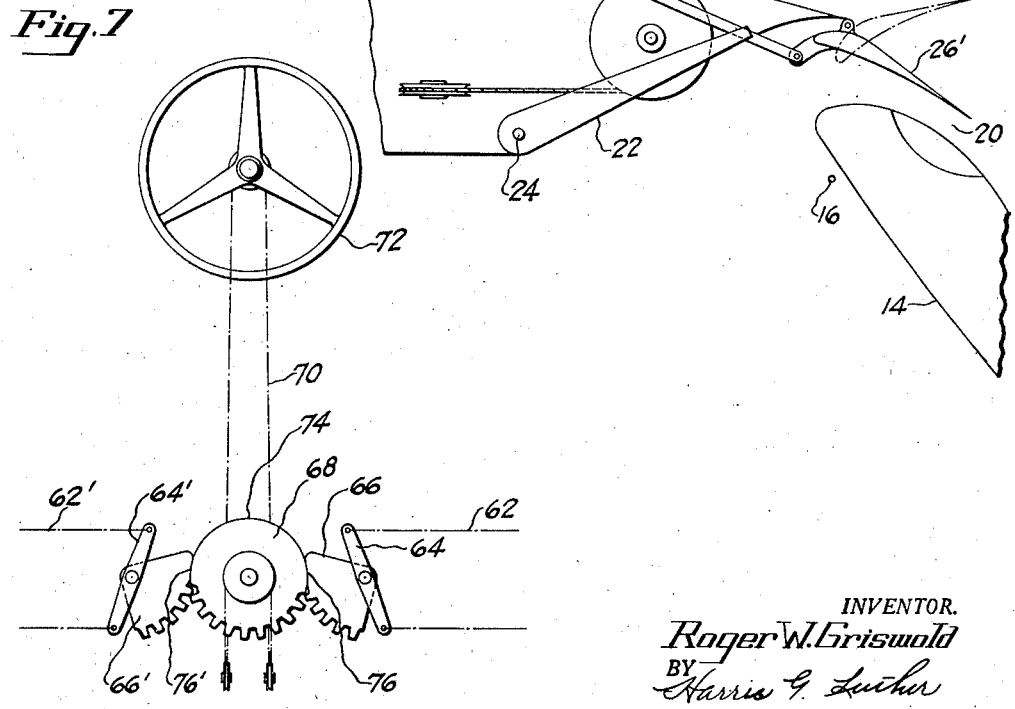

Patented May 17, 1938

2,117,607

UNITED STATES PATENT OFFICE 2,117,607

SLOTTED DEFLECTOR FLAP

Roger W. Griswold, II, Old Lyme, Conn., assignor to United Aircraft Corporation, East Hartford, Conn., a corporation of Delaware Application August 4, 1936, Serial No. 94,189

24 Claims. (Cl. 244—42)

This invention relates to lift increasing devices for airplanes, and has particular reference to a wing construction arranged to provide for an increased lift when the airplane is operating at relatively slow speeds such as in taking off, climbing, and landing.

One well-known form of lift increasing device is the wing flap, and one of the best of this type is the so-called slotted flap. This invention is particularly concerned with an improvement in wing lift increasing devices of the type known as slotted flaps.

In the slotted flap type the flap is so positioned relative to the fixed wing that a wing slot is formed by the curved under surface of the fixed wing and the leading edge of the flap. A wing slot is a passage extending through the wing having a larger entrance gap at the lower surface than exit gap at the upper surface, such relation usually being termed the slot confinement ratio or slot nozzle effect, and having such passage so directed that the flow from the lower surface may enter the slot irrespective of its angular relation to the direction of the free stream flow but may only discharge from the exit gap in the direction of and substantially parallel to the upper surface flow. It has been found in practice that a wing slot having a confinement ratio between the values of five to one and ten to one has good aerodynamic proportions. These are not necessarily limiting values of the confinement ratio but, at present, are believed to give the best efficiency.

An object of this invention is to obtain an improved lift increasing device.

A further object is to extend the lift increasing effect of the slotted flap over a large range of flap angles.

A still further object is to effectively maintain a wing slot of good aerodynamic proportion irrespective of angular position of the flap.

In the accompanying drawings in which like reference numerals are used to designate similar parts throughout, there is illustrated, somewhat schematically, a suitable embodiment of what is now considered to be the preferred form of the idea of the invention and two somewhat modified forms thereof. The drawings, however, are for the purpose of illustration only and are not to be taken as limiting the invention, the scope of which is to be measured entirely by the scope of the appended claims.

In the drawings, Fig. 1 is a partly schematic sectional view of the rear portion of an airplane wing constructed according to the idea of this invention showing the lift increasing flap in its neutral or normal flight position;

Fig. 2 is a view similar to Fig. 1 showing the flap in its half-flap or normal take-off position;

Fig. 3 is a view similar to Fig. 1 showing the flap in its full-flap or maximum angular position for landing or gliding;

Fig. 4 is a partly schematic sectional view similar to Fig. 1 showing a somewhat modified form of lift increasing flap construction;

Fig. 5 is a partly schematic sectional view similar to Fig. 1 showing a somewhat modified form of the idea of the invention in which the lift increasing device is also utilized for securing lateral control of the aircraft;

Fig. 6 is a view similar to Fig. 5 showing the main lift increasing flap in a downwardly inclined or lift increasing position;

Fig. 7 is a somewhat schematic illustration of the manually operable means for actuating the improved lift increasing device to provide lateral control of the aircraft.

Referring to the drawings in detail, the numeral 10 generally indicates a fixed wing portion, the broken away rear portion of which is illustrated. This fixed portion may be provided with a rear spar schematically indicated at 12 to which is hinged a movable full trailing edge flap 14 mounted to pivot about the point 16. The flap is constructed with a selected airfoil section. The rear edge of the fixed portion 12 of the wing has an extension which provides a rearwardly and upwardly directed curved surface 18 at the rear edge of the fixed portion which overlies the forward surface of the movable flap, and provides between these surfaces a slot which decreases in width from bottom to top, is generally inclined rearwardly, and is provided at its upper end with a restricted outlet 20, as illustrated in Fig. 1, such a slot, of good aerodynamic characteristics will have a confinement ratio of from between 5 and 10 to 1.

A slot closure door 22 is hingedly secured at the lower portion of the rear edge of the fixed wing portion 10, as indicated at 24, and has two operative positions. In the first operative position illustrated in Fig. 1, the undersurface of the slot closure door forms a continuation of the undersurface of the fixed portion of the wing and of the undersurface of the movable flap, and effectively closes the bottom opening of the slot. When the parts are in the relation illustrated in Fig. 1 with the trailing edge flap in its uppermost position and the slot closure door in its lowermost position, the wing is in effect an ordinary solid wing of unbroken selected airfoil contour, and has substantially no drag loss over that of an ordinary solid wing.

In its alternative operative position, the door 5 is inclined upwardly against the rear of the fixed portion of the wing, as illustrated in Figs. 2 and 3, in which position it completely opens the bottom of the slot and its undersurface constitutes a portion of one side of the slot. When the slot closure door is in the operative position illustrated in Figs. 2 and 3, the maximum amount of air can flow through the slot provided between the rear edge of the fixed portion of the wing and the forward edge of the trailing edge flap.

The construction so far described provides the advantage of increased lift when the trailing edge flap is tilted without the disadvantage of materially increased drag when the trailing edge flap is in its neutral or normal flying position.

A deflector plate 26, which may be of airfoil section, is positioned immediately above the upper portion of the forward edge of the trailing edge flap 14, and is secured to the trailing edge flap by suitable supports, as indicated at 28, the deflector plate being thereby fixed to and movable with the trailing edge flap. This plate is so arranged that a slot of selected aerodynamic characteristics is provided between the undersurface of the plate and the upper surface of the forward edge of the wing trailing edge flap, the slot between the plate and flap being in general a continuation of the slot between the rear edge of the fixed portion of the wing and the forward edge of the trailing edge flap. The upper surface of the deflector plate 26 is constructed to move within the curved upper rear surface of the fixed wing portion. The effect of the deflector plate, as is clearly apparent from the illustration in Figs. 1, 2, and 3, is to curve and extend the slot between the fixed portion of the wing and the movable trailing edge flap as the flap is inclined downwardly to thereby effectively maintain a wing slot of good aerodynamic proportions irrespective of the angular position of the flap. The effect of this construction is to control the air flow over the upper surface of the flap by reason of the change of direction and acceleration of the flow of the air passing through the slot and thus a high velocity airflow is directed over the upper surface of the wing trailing edge flap at all flap positions within a wide range of flap movement, the range illustrated in the drawings being from approximately zero to 45°. With this construction, the maximum lift effect can be obtained from the trailing edge flap at this and greater angles without stalling the flap and having the air break away from the upper flap surface and thereby cause the flap to lose its lift.

Preferably, the deflector plate 26 is so located with respect to the forward edge of the wing trailing edge flap and the rear edge of the fixed portion of the wing, that when the slot closure door 22 is in its uppermost position, a slot exit is provided along both the upper and lower surfaces of the deflector plate. As stated above, this deflector plate may be either a simple curved plate or of conventional airfoil contour, and as the air acquires high velocity in flowing through the slot this deflector plate becomes, when the slot is open, a highly energized airfoil which materially assists in improving the overall lift characteristics of the wing by helping to maintain an unbroken flow over the upper surface of main wing, as well as increasing the angular range of trailing edge flap settings.

The trailing edge flap 14 is moved from one to another of its operative positions by suitable means, such as the hydraulic expansible chamber device 30. In this arrangement a cylinder 32 is pivotally connected to the rear surface of the spar 12 and reciprocably receives a piston to which is attached a rod 34 the free end of which is pivotally connected to the wing trailing edge flap, as indicated at 36. Manually operable means are provided for controlling the flow of hydraulic fluid under pressure to the opposite ends of the cylinder 32 so that the trailing edge flap 14 may be manually adjusted from one to another of its various operative positions.

The slot closure door 22 is likewise operated by suitable means, such as the hydraulic expansible chamber device 38. This device includes a cylinder 40 pivotally connected at one end to the fixed portion of the wing, as indicated at 42, and provided with a reciprocable piston to which is connected a rod 44, the free end of which is pivotally connected to the slot closure flap, as indicated at 46. The supply of hydraulic fluid to the cylinder 40 is also manually controlled so that the slot closure door 22 may be moved from one to the other of its operative positions at the will of the operator of the vehicle upon which the lift increasing construction is provided.

Separate manual control of the wing trailing edge flap and the slot closure door has distinct advantages in that it gives independent control of the two devices at the will of the operator.

While the improved construction has been illustrated and so far described as applied entirely to a wing trailing edge lift increasing flap, it is obvious that the same construction could readily be applied to any other movable portion of the wing, such as an aileron, and where the same wing is provided with both a flap, or flaps, and ailerons, the lift increasing device may be applied to both. Obviously, the invention would have particular application to ailerons which may be held in a downwardly inclined position or drooped for the purpose of increasing the lift of the wing, and it is within the scope of the invention to cover a construction in which the wing is provided over a portion of its span with a flap, or flaps, constructed according to the idea illustrated in the drawings and described above, and over other portions of its span with ailerons which may be drooped when the flap is tilted downwardly to assist the flap in increasing the lift characteristics of the wing.

From this description it will be observed that the construction as described above provides the advantage, long sought after in the art, of materially increasing the lift characteristics of the wing, particularly at relatively low air speeds, without the consequent disadvantages inherent in the prior art.

In the modified form of the invention shown in Fig. 4, the slot closure member, as indicated at 50, is hingedly attached at the upper rearward portion of the fixed wing portion, as indicated at 52, and serves as a combined slot closure member and guide vane. The member 50 is preferably operated independently of the main trailing edge flap 14' and controls the amount of air flowing through the slot and the direction of the air stream flowing over the upper surface of the trailing edge flap. While this modified form of the invention is believed to be inferior in some respects, such as the range of lift increasing effect, to the form illustrated in Figs. 1, 2, and 3, its greater simplicity of construction and economy of parts may recommend its use in certain installations.

In the form of the invention illustrated in Figs. 5, 6, and 7, the lift increasing device has been arranged to provide for lateral control of the aircraft. The fixed wing portion 10 has the trailing edge flap 14 hingedly secured thereto and movable about the line 16, as described above in connection with Figs. 1, 2, and 3. The slot closure member 22 is also hinged at the lower portion of the rearward edge of the fixed wing portion in the manner described above, and both the slot closure member and the trailing edge flap are movable by suitable means, such as is illustrated in Figs. 1, 2, and 3 and described in connection therewith, such means being omitted from Figs. 5 and 6 for the sake of clearness in the illustration.

In the modified form of the invention as illustrated in Figs. 5, 6, and 7, the guide vane 26', instead of being rigidly attached to the forward portion of the trailing edge flap, as provided in the form of the invention illustrated in Figs. 1, 2, and 3, is hingedly connected to the upper portion of the rear edge of the fixed wing portion to tilt about an axis indicated at 54. The movable guide vane 26' is provided with an extension 56 to the outer end of which is pivotally connected one end of a link member 58 the opposite end of which is pivotally connected to a disk or crank member 60 rotatably mounted in the rearward portion of the fixed wing portion. The disk member 60, the link 58, and the extension 56 are so arranged that upon rotation of the disk 60 the movable guide vane 26' may be tilted about the axis 54 to any position within a range of movement indicated by the full line and dotted line positions of the guide vane in Fig. 5. If necessary, a depression 57 may be provided in the flap to allow clearance for the extension 56 and attached end of the link 58.

The disk 60 is rotated by means of a cable 62 operatively connected with a lever member 64 which is, in turn, rigidly connected with a gear sector 66. The teeth of the gear sector 66 mesh with the teeth of a gear member 68 operatively connected by suitable means, such as the chain 70, with the hand wheel 72 customarily employed for controlling the lateral movements of an aircraft and maintaining its lateral stability.

The guide vane 26' will, of course, be provided in two separate sections located one upon each side of the longitudinal center of the airplane in the same manner that the ailerons ordinarily employed are disposed. Each movable guide vane is actuated by a separate cable, the two cables being indicated at 62 and 62' in Fig. 7. The ends of the cable 62' are connected to a lever member 64', similar to the lever member 64, which is in turn rigidly connected with a gear sector 66', similar to the gear sector 66, and meshing with the teeth of the gear 68 upon the opposite side of the gear 68 from the gear sector 66. The gear 68 is a mutilated gear and is provided over a portion of its circumference with an arcuate cam portion 74 which cooperates with complementary cam portions 76 and 76' on the gear sectors 66 and 66' respectively in such manner that only one of the gear sectors will be operated at a time. As illustrated in Fig. 7, if the hand wheel 72 be rotated in a clockwise direction, gear 68 will rotate counterclockwise and the gear sector 66 will be moved to change the position of the guide vane section to which the cable 62 is attached, while the cam portion 74 will slide upon the cam portion 76' of the gear sector 66' so that the gear sector 66' will not be moved. If the wheel 72 be rotated in a counterclockwise direction, the gear sector 66 will be maintained stationary, and the gear sector 66' will be moved to adjust the position of the movable guide vane to which the cable 62' is attached. By this means, the movable guide vanes will be moved over a range extending only from the neutral position illustrated in full lines in Fig. 5 to their upper position illustrated in dotted lines in that figure, and the effect of adjusting the guide vanes will be to urge downwardly the wing half upon which the guide vane being actuated is located. The guide vane mounted upon the opposite half of the wing maintains its neutral position and that half of the wing tends to maintain itself level with respect to the airplane.

As the movable guide vane sections are mounted adjacent to the upper opening of the slot provided between the trailing edge flap and the fixed portion of the wing, the effect of the guide vanes when tilted upwardly above their neutral position will be that of a lift spoiler since the air flowing along the upper surface of the fixed portion of the wing and the air flowing through the slot will be diverted away from the upper surface of the wing in such manner as to cause the wing to lose a considerable portion of its lift. At the same time, the upwardly tilted guide vane will greatly increase the resistance of the wing half upon which it is mounted, thus giving to the lateral control of the airplane an effect known as positive yaw. The combined effect of the movable guide vane is such that when the aircraft is being turned by elevating the guide vane section located upon the inner side of the curved path of travel, the inner wing is depressed and simultaneously retarded so that the aircraft tends to circle immediately about a point upon which the curved path of travel is centered.

The movable guide vane sections 26' may be independently adjusted to control the flow of the airstream over the upper surface of the flap whereby the lift and drag coefficients of either wing half may be manually controlled to effect lateral and directional trim of the aircraft.

The effect of the movable guide vane sections is dependent to a considerable extent upon the position of the slot closure member 22, their effect being much more pronounced when the slot closure member is open than when it is closed and also increasing with the downward inclination of the main trailing edge flap 14. This relation gives a particularly desirable condition for controlling the aircraft. For instance, when the aircraft is climbing at a relatively slow airspeed with the slot closure member 22 in its uppermost position and the main trailing edge flap 14 tilted downwardly, the effect upon the lateral control of the aircraft of the movable guide vane sections 26' will be at its maximum. As it is highly desirable to have the controlling effect of the aircraft control surfaces at the maximum when the airspeed is low, it will be seen that this arrangement offers that particular feature of advantage. When the slot closure member 22 is in its lowermost position and the main trailing edge flap is in its uppermost or neutral position, as illustrated in Fig. 5, which is the condition for cruising at relatively high air speeds, the effect of the movable guide vane section will be at the minimum, both as to lift spoiling and drag. This is also a desirable condition since at high air speeds very slight effect of the control surfaces is necessary to obtain the desired amount of maneuverability, and an excessive amount causes unnecessarily heavy loads upon the manual control apparatus and also renders the aircraft oversensitive in its response to the controls.

With the above described arrangement, it will be apparent that the guide vane sections are made to serve a dual purpose since they not only effectively improve the lift increasing effect of the flap mechanism in the manner described in connection with Figs. 1, 2, and 3, but may also be used as ailerons to provide for lateral control of the aircraft in flight, thus doing away with the necessity for the provision of the usual form of ailerons and rendering it entirely practical to extend the lift increasing flap construction for the entire span of the wing in combination with which the construction is employed.

While there has been illustrated and described a particular mechanical arrangement exemplifying the idea of the invention, it is to be understood that the invention is not to be limited to the particular arrangement so illustrated and described, but that such changes in the size, shape, and arrangement of parts may be resorted to as come within the scope of the appended claims.

Having now described the invention so that others skilled in the art may clearly understand the same, what it is desired to secure by Letters Patent is as follows:

What is claimed is:

1. A wing lift increasing device comprising, a manually actuatable tiltable flap constituting a hingedly mounted part of the rear portion of the wing spaced from the fixed wing portion to provide a re-energizing wing slot between the fixed wing portion and the flap, and a curved deflector plate projecting at its forward edge into said slot at all operative positions of said flap to direct the re-energizing slot discharge along the upper surface of said flap.

2. A wing lift increasing device comprising, a tiltable flap constituting a hingedly mounted part of the rear portion of the wing spaced from the fixed wing portion to provide a wing slot between the fixed wing portion and the flap, a curved deflector plate mounted on said flap and projecting at its forward edge into said slot in all positions of angular inclination of the flap, said deflector plate being so shaped and so positioned on said flap as to provide between said plate and said flap a space having selected aerodynamic characteristics for increasing the velocity of the air at the exit end of said space between the rear edge of said plate and the adjacent portions of the upper surface of said flap.

3. A wing lift increasing device comprising a tiltable flap constituting a hingedly mounted part of the rear portion of the wing spaced from the fixed wing portion to provide a wing slot between the fixed wing portion and the flap, a door pivotally secured to the fixed wing portion in position to extend across the bottom of said slot to close the same when in one operative position and to open said slot when in its alternate operative position, and a deflector plate vane mounted on said flap and projecting at its forward edge into said slot to receive air flowing through said slot when said door is in its slot opening position, and discharge such air along the upper surface of said flap in all positions of inclination of said flap.

4. In a wing lift increasing device, a trailing edge flap spaced to provide a wing slot between said flap and the fixed portion of the wing, and means for extending and curving said slot at the discharge end thereof.

5. In a wing lift increasing device, in combination with a trailing edge flap spaced to provide a wing slot between the flap and the wing, means for extending and curving said slot to discharge air flowing through said slot along the upper surface of said flap in all positions of inclination of said flap, and means for opening and closing said slot.

6. In a wing lift increasing device, in combination with a trailing edge flap spaced to provide a wing slot between the flap and the wing, means for extending and curving said slot to discharge air flowing through said slot along the upper surface of said flap in all positions of inclination of said flap, said means being effective to increase the velocity of the air flowing through said slot.

7. A wing lift increasing device comprising, a tiltable flap constituting a part of the rear portion of said wing, manually controllable means operative to open and close an air flow aperture between the fixed portion of said wing and said flap, an independently movable member associated with each half of said wing and extending into said aperture in all operative positions of said flap for normally directing the air flowing through said aperture over the upper surface of said flap to retain the lift increasing function thereof over the entire operative range of flap inclination, and manually operable means operatively associated with each of said movable members to move said members to positions in which they reduce the lift of the respective wing halves on which they are mounted.

8. In a wing lift increasing device for aircraft comprising, a tiltable flap constituting a part of the rear portion of said wing and located with respect to the fixed portion of the wing to provide a wing slot between the fixed wing portion and the flap, a movable guide vane associated with each lateral half of said wing and constituting a portion of the discharge end of said slot in all operative positions of said flap for normally directing air flowing through said aperture over the upper surface of said flap to maintain the lift increasing effect of said flap at all operative positions thereof, manually actuatable means for operating said guide vanes as ailerons to provide lateral control for the aircraft employing said wing lift increasing device by spoiling the lift of the wing and flap portions with which the respective guide vanes are associated, and means manually operable independently of said flap and said guide vanes for opening and closing said slot.

9. A variable lift wing comprising a relatively fixed portion having a rearward projection and a relatively movable portion underlying said projection and spaced from said fixed portion to provide an upwardly and rearwardly sloped and tapered slot between said portions, and a deflector plate on said movable portion spaced therefrom to provide a tapered slot fixed with respect to said movable portion and underlying said projection in all operative positions of said movable portion to maintain the continuity of the slot between said portions.

10. A variable lift wing comprising a relatively fixed portion having a rearward projection, and a relatively movable portion underlying said projection and spaced from said fixed portion to provide a rearwardly and upwardly sloped and tapered slot between said portions, and a deflector plate secured to said movable portion in position to underlie said projection in all operative positions of said movable portion relative to said fixed portion to provide a restricted slot exit gap fixed relatively to said movable portion and to maintain the continuity of said slot up to said exit gap.

11. In a variable lift wing, a relatively fixed portion having a rearward projection and a relatively movable portion at the rear of said fixed portion underlying said projection and spaced from said fixed portion to provide an upwardly and rearwardly sloped and tapered slot between said portions, and a deflector plate on said movable portion underlying said projection and spaced therefrom to provide a slot portion fixed with respect to said movable portion and continuous with the slot between said portions, and a second slot portion between said deflector plate and said projection in all operative positions of said movable portion.

12. In a wing lift increasing device a trailing edge flap spaced to provide a wing slot between said flap and the fixed portion of the wing, and means extending into the upper end of said slot in all operative positions of said flap to shape said slot to prevent the stall of said flap.

13. In combination, an airfoil, a flap spaced from said airfoil, and a deflector plate movable with said flap and located in the space between said flap and airfoil in all operative positions of said flap.

14. In combination, an airfoil, a lift increasing flap movable through a predetermined range relative to said airfoil and spaced therefrom to form a wing slot therebetween leading from the lower to the upper side of said airfoil and flap combination, and means extending into the discharge end of said slot in all operative positions of said flap to divide said slot at its discharge end into a plurality of exits.

15. In combination, an airfoil, a lift increasing flap movable through a predetermined range relative to said airfoil and spaced therefrom to form a wing slot therebetween leading from the lower to the upper side of said airfoil and flap combination, and means for preventing the stall of said flap comprising a deflector, a part of which at all times underlies the rear portion of said airfoil for providing a plurality of exits at the discharge end of the slot directed in the normal direction of air flow along the upper surface of said airfoil and of said flap.

16. In combination an airfoil, a lift increasing flap movable through a predetermined range relative to said airfoil for increasing the lift of said airfoil and spaced therefrom to form a wing slot therebetween, a deflector constructed and arranged to extend into said slot at all flap positions to provide a plurality of rearwardly discharging slot exits, one of which exits has a substantially constant direction relative to said wing and another of which exits changes its direction in accordance with the movement of said flap.

17. A variable lift wing comprising pivotally connected relatively movable portions of airfoil contour, a deflector plate overlying the forward upper portion of the rearward wing portion to provide a slot for discharging air over the upper surface of the rearward portion at a constant angle with respect thereto, said forward portion having a rearward projection of such an extent as to overhang the leading edge of said deflector plate in all operative positions of said wing portions with respect to each other.

18. In a variable lift wing having a basic airfoil contour a relatively fixed portion and a movable flap portion for increasing the lift coefficient of the wing, said fixed portion having a recess into which the forward part of said movable portion projects, and a deflector plate on the forward part of said movable portion so shaped and positioned as to remain at all times within said basic airfoil contour of said wing.

19. A variable lift wing comprising a relatively fixed portion having a rearwardly curved rear edge, a tiltable airfoil flap at the rear of said fixed portion spaced therefrom to provide an energy conversion slot therebetween, and a curved deflector plate on said flap telescopically associated with said curved rear edge, said deflector having its leading edge spaced forwardly and downwardly from said rear edge an angle distance about the axis of movement of said flap at least as great as an angle including the range of operative movement of said flap.

20. In combination a wing, an airfoil movable relative to said wing to vary the aerodynamic characteristics of said wing and airfoil combination and constructed and arranged to form with said wing a lift increasing wing slot having an exit end, and a plate associated with said airfoil constructed and arranged to extend the exit end of said slot and retain the integrity thereof in all operative positions of said airfoil to thereby maintain the lift increasing properties of said slot with respect to said airfoil.

21. In a wing combination including a relatively fixed portion and a relatively movable portion associated in a spanwise direction to provide between the adjacent surfaces of said portions an aerodynamic slot having a relatively wide air entrance opening at the lower surface of said wing combination and curved converging side walls for causing acceleration of the air flow through said slot and to provide a relatively narrow air exit opening at the upper surface of said wing combination directed substantially parallel to the upper surface of said wing combination for discharging air at increased velocity in the direction of airflow over said upper surface and a deflector plate associated with said relatively movable portion and positioned at least partially within said slot at all operative positions of said relatively movable portion for maintaining the integrity of said slot and for extending said slot and maintaining said air exit opening directed substantially parallel to the upper surface of said relatively movable portion in all operative positions of said portions.

22. A variable lift wing comprising a relatively fixed portion and a relatively movable portion spaced to provide a rearwardly and upwardly sloped and tapered wing slot therebetween, and members telescopically associated in all operative positions of said movable portion with respect to said fixed portion, mounted on said respective portions to maintain the integrity of said slot throughout the operative range of movement of said movable portion with respect to said fixed portion.

23. In combination, an airfoil, a lift increasing flap movable through a predetermined range relative to said airfoil and spaced therefrom to form a wing slot therebetween leading from the lower to the upper side of said airfoil and flap combination, and means extending at least partially within said slot in all operative positions of said flap to divide said slot into a plurality of exit gaps, said means so constructed and arranged that one exit gap changes its direction of discharge to constrain said discharge to follow the upper surface of said flap throughout the operative range of flap movement.

24. A wing lift increasing device comprising, a tiltable flap constituting a part of the rear portion of said wing and spaced therefrom to provide a wing slot therebetween, manually controllable means operative to maintain a substantially unbroken airfoil contour for said wing or to open said wing slot, and a curved guide vane carried by said flap and extending into said wing slot in all positions of inclination of said flap to receive air flowing through said slot along both the upper and lower surfaces thereof to maintain a flow of air along the upper surface of the flap in all positions of inclination of the flap, and to constitute of itself a highly energized airfoil.

ROGER W. GRISWOLD, II.